(12) United States Patent
Richard et al.

(10) Patent No.: US 12,508,347 B2
(45) Date of Patent: Dec. 30, 2025

(54) NON-BREAKING FILAMENT FOR SHAPING BONE AND DENTAL SUBSTITUTES

(71) Applicant: SEPTODONT OU SEPTODONT SAS OU SPECIALITES SEPTODONT, Saint-Maur-des-Fossés (FR)

(72) Inventors: Gilles Richard, Saint-Maur-des-Fossés (FR); Dai Pham, Saint-Maur-des-Fossés (FR)

(73) Assignee: SEPTODONT OU SEPTODONT SAS OU SPECIALITES SEPTODONT, Saint-Maur-des-Fossés (FR)

( * ) Notice: Subject to any disclaimer, the term of this patent is extended or adjusted under 35 U.S.C. 154(b) by 780 days.

(21) Appl. No.: 17/771,654

(22) PCT Filed: Nov. 6, 2020

(86) PCT No.: PCT/EP2020/081320
§ 371 (c)(1),
(2) Date: Apr. 25, 2022

(87) PCT Pub. No.: WO2021/089798
PCT Pub. Date: May 14, 2021

(65) Prior Publication Data
US 2022/0409771 A1    Dec. 29, 2022

(30) Foreign Application Priority Data
Nov. 8, 2019    (EP) .................... 19306452

(51) Int. Cl.
*A61L 27/44* (2006.01)
*B29C 64/118* (2017.01)
(Continued)

(52) U.S. Cl.
CPC .......... *A61L 27/446* (2013.01); *B29C 64/118* (2017.08); *B33Y 10/00* (2014.12);
(Continued)

(58) Field of Classification Search
CPC .......... A61L 2430/02; B29K 2067/046; B29K 2071/00; C08L 67/04; C08F 16/06; C08G 63/664; C08G 2650/40
See application file for complete search history.

(56) References Cited

U.S. PATENT DOCUMENTS 6,730,252 B1    5/2004    Teoh et al.
9,745,452 B2    8/2017    Hwang et al.
(Continued)

FOREIGN PATENT DOCUMENTS

CA    2246318 A1    8/1997
CN    102256633 A    11/2011
(Continued)

OTHER PUBLICATIONS

International Search Report and Written Opinion of the International Searching Authority mailed Nov. 24, 2020, in corresponding to International Application No. PCT/EP2020/081320; 10 pages.
(Continued)

*Primary Examiner* — Kregg T Brooks
*Assistant Examiner* — David R. Foss
(74) *Attorney, Agent, or Firm* — Maier & Maier, PLLC

(57) ABSTRACT

Materials for additive manufacturing. More precisely, a non-breaking filament, preferably for 3D printing bone substitutes. The filament includes 50% to 99% in weight to the total weight of the filament (w/w) of a polymeric matrix and 1% to 50% w/w of tricalcium silicate. Also, a method and composition for preparing the filament. Additionally, the uses of the filament, such as for example in the dental field; especially, for providing suitable bone and dental substitutes.

15 Claims, 3 Drawing Sheets

(51) Int. Cl.

| | |
|---|---|
| *B29K 67/00* | (2006.01) |
| *B29K 71/00* | (2006.01) |
| *B29K 509/00* | (2006.01) |
| *B33Y 10/00* | (2015.01) |
| *B33Y 70/10* | (2020.01) |
| *B33Y 80/00* | (2015.01) |
| *C08F 16/06* | (2006.01) |
| *C08G 63/664* | (2006.01) |
| *C08L 67/04* | (2006.01) |

(52) U.S. Cl.
CPC .............. *B33Y 70/10* (2020.01); *B33Y 80/00* (2014.12); *A61L 2430/02* (2013.01); *B29K 2067/046* (2013.01); *B29K 2071/00* (2013.01); *B29K 2509/00* (2013.01); *B29K 2995/0018* (2013.01); *C08F 16/06* (2013.01); *C08G 63/664* (2013.01); *C08G 2650/40* (2013.01); *C08L 67/04* (2013.01)

(56) References Cited

U.S. PATENT DOCUMENTS

| | | | |
|---|---|---|---|
| 11,186,663 | B2 | 11/2021 | Xu et al. |
| 2012/0040002 | A1 | 2/2012 | Lehtonen et al. |
| 2012/0058152 | A1 | 3/2012 | Garcia De Castro Andrews et al. |
| 2017/0043052 | A1 | 2/2017 | San Antonio et al. |
| 2018/0065294 | A1 | 3/2018 | Yamashita et al. |

FOREIGN PATENT DOCUMENTS

| | | |
|---|---|---|
| CN | 102470193 A | 5/2012 |
| CN | 106620858 A | 5/2017 |
| CN | 107548347 A | 1/2018 |
| CN | 108670505 A | 10/2018 |
| CN | 109453426 A | 3/2019 |
| GB | 951768 A | 3/1964 |
| JP | H10298108 A | 11/1998 |
| JP | 2007512083 A | 5/2007 |
| JP | 2016210947 A | 12/2016 |
| JP | 2017047188 A | 3/2017 |
| KR | 1020180001191 A | 1/2018 |
| KR | 20180128227 A | 12/2018 |
| WO | 2005048885 A | 6/2005 |
| WO | 2018144141 A1 | 8/2018 |
| WO | 2018189384 A1 | 10/2018 |
| WO | 2019185524 A1 | 10/2019 |

OTHER PUBLICATIONS

Ryosuke Matsuzaki et al., "Three-dimensional printing of continuous-fiber composites by in-nozzle impregnation"; Scientific Reports; vol. 6; No. 1; Mar. 11, 2016; XP055466746; DOI 10.1038/srep23058; 7 pages.

Hu et al., "Construction and Characteristics of Poly(lactic-co-glycolic acid)/Calcium Silicate Three-dimensional Porous Scaffolds for Bone Tissue Engineering", Chinese Journal of Tissue Engeneering Research, 2016, vol. 20, No. 47, pp. 6997-7005.

Chia et al., "Recent advances in 3D printing of biomaterials", Journal of Biological Engineering, 2015, vol. 9, No. 4, 14 pages.

Ho et al., "The Effects of Biodentine/Polycaprolactone Three-Dimensional-Scaffold with Odontogenesis Properties on Human Dental Pulp Cells", International Endodontic Journal, John Wiley & Sons Ltd, May 2018,, vol. 51, pp. e291-e300.

Corcione et al., "Highly Loaded Hydroxyapatite Microsphere/PLA Porous Scaffolds Obtained by Fused Deposition Modelling", Ceramics International, Elsevier Ltd. and Techna Group S.R.L., Aug. 1, 2018, vol. 45, pp. 2803-2810.

Zhu, "Polymer Materials via Melt Based 3D Printing: Fabrication and Characterization", TigerPrints, Clemson University, All Theses 2895, May 2018, 6 pages.

Corcione et al., "The Feasability of Printing Polylactic Acid-Nanohydroxyapatite Composites Using a Low-Cost Fused Deposition Modeling 3D Printer", Journal of Applied Polymer Science, Wiley Periodicals, Inc., ISSN: 0021-8995, Nov. 28, 2016, vol. 134, Issue 13, 44656, 10 pages.

Office Action issued on Jul. 28, 2025, in corresponding Brazilian Application No. BR112022008508-7, 8 pages.

NON-BREAKING FILAMENT FOR SHAPING BONE AND DENTAL SUBSTITUTES

FIELD

The present invention relates to the field of materials, preferably the field of materials for additive manufacturing. More precisely, the present invention relates to a non-breaking filament for shaping bone substitutes, said filament comprising a polymeric matrix and tricalcium silicate.

The present invention also relates to a method for preparing said filament. The present invention also concerns uses of said filament, such as for example in the dental field; especially, for providing bone substitutes.

BACKGROUND

Used in oral surgery, periodontics or implant dentistry, bone substitutes aim to recreate a bone volume in order to overcome the insufficiencies of height and/or thickness of a bone.

Nowadays, using bone substitutes is an interesting alternative to bone autografting. Indeed, implanting a bone substitute is more comfortable for the patient. Compared to autografting, it avoids post-operative pain at the donor site and side reactions such as for example, infectious complications.

Today, there is always a need for developing new processes for manufacturing bone substitutes that are easier to be implemented and that fit with a higher accuracy with the bone defect to be filled.

In recent years, the interest for 3D printing technologies has strongly raised up due to their ease of implementation and their very broad scope. Among these technologies, fused filament deposition (FFD) is increasingly being used due to its affordability and its ability to print an object with a very high level of accuracy.

However, depending on the field of application in which FFD is used, it is necessary to adapt the corresponding raw materials.

Consequently, for manufacturing bone substitutes by 3D-printing techniques such as FFD, there is a need for providing suitable raw materials, featuring both (i) good handling properties for 3D-printing and (ii) good biological and physicochemical properties of the shaped object intended to be implanted in the human body. Especially, to be used in FFD, the raw materials have to be under the form of a filament that may be wrapped around a coil intended to feed a FFD printer. Thus, said filament must be pliable and must not break when wrapped around the coil.

For manufacturing bone substitutes or dental substitutes, a high mineral load is required. But in the field of 3D-printing, it is known that increasing the mineral load in an organic filament leads to strengthen said filament. Consequently, it is expected that a high mineral load in a filament provides filaments which easily break and which are not usable in FFD.

Surprisingly, the Applicant evidences that a filament comprising 50% to 99% in weight to the total weight of the filament (w/w) of a polymeric matrix; and 1% to 50% w/w of tricalcium silicate, features non-breakable properties and may be stored under a filament coil. Furthermore, the Applicant showed that the filament of the invention may be successfully used in a filament filed deposition printer for manufacturing bone substitutes or dental substitutes. Advantageously, the process for manufacturing the filament of the invention, is moisture-free in order to maintain the whole potential of the biomechanical properties generated by the hydration of silicate calcium, under the form of particles or any other suitable forms well-known by the skilled artisan, during implantation of the substitute in the patient's body.

SUMMARY

Thus, the present invention refers to a filament comprising:
- 50% to 99% in weight to the total weight of the filament (w/w) of a polymeric matrix; and
- 1% to 50% w/w of tricalcium silicate.

According to one embodiment, the filament of the invention further comprises dicalcium silicate. According to one embodiment, the filament of the invention further comprises dicalcium silicate, tricalcium aluminate, tricalcium oxide, gypsum and/or Portland cement.

According to one embodiment, the polymeric matrix is made of at least one biocompatible polymer; preferably selected from poly(lactic acid) or poly(lactide) (PLA), poly(glycolic acid) or poly(glycolide) (PGA), poly(lactide-co-glycolide) (PLGA), polycaprolactone (PCL), poly-(D,L)-lactide (PDLLA), polydioxanone (PDO), polyvinylalcohol (PVA), polyetheretherketones (PEEK), polyetherimide (PEI) and any mixtures thereof; more preferably PLGA.

According to one embodiment, the polymeric matrix is made of at least one biocompatible polymer; preferably selected from poly(lactic acid) or poly(lactide) (PLA), poly(glycolic acid) or poly(glycolide) (PGA), poly(lactide-co-glycolide) (PLGA), polycaprolactone (PCL), poly-(D,L)-lactide (PDLLA), polydioxanone (PDO), polyvinylalcohol (PVA), polyetherketoneketones (PEKK), polyetheretherketones (PEEK), polyetherimide (PEI) and any mixtures thereof; more preferably PLGA.

According to one embodiment, the amount of tricalcium silicate is ranging from 1% to 30% w/w; preferably from 10% to 20% w/w.

According to one embodiment, the amount of polymeric matrix is ranging from 70% to 99% w/w; preferably from 80% to 90% w/w.

According to one embodiment, the filament of the invention further comprises a radiopacifier, preferably selected from zinc oxide, zirconium oxide, yttrium oxide, tin oxide, barium sulfate, tungsten oxide, bismuth oxide and barium oxide.

According to one embodiment, the filament of the invention comprises:
- 70% to 99% w/w of PLGA; and
- 1% to 30% w/w of tricalcium silicate.

According to one embodiment, the filament of the invention comprises:
- 70% to 99% w/w of PLGA or PEEK; and
- 1% to 30% w/w of tricalcium silicate.

According to one embodiment, the filament of the invention has a diameter ranging from 1 mm to 10 mm, preferably from 1 to 5 mm; more preferably from 1.5 mm to 2.5 mm.

The present invention also concerns a filament coil, wherein the filament is a filament as defined above.

The present invention also concerns a composition for manufacturing a filament as defined above, said composition comprising:
- 50% to 99% in weight to the total weigh of the composition (w/w) of at least one biocompatible polymer; preferably selected from poly(lactic acid) or poly(lactide) (PLA), poly(glycolic acid) or poly(glycolide) (PGA), poly(lactide-co-glycolide) (PLGA), polycaprolactone (PCL), poly-(D,L)-lactide (PDLLA), polydioxanone (PDO), polyvinylalcohol (PVA), polyetheretherketones (PEEK), polyetherimide (PEI) and any mixtures thereof; more preferably PLGA; and 1% to 50% of tricalcium silicate.

The present invention also concerns a composition for manufacturing a filament as defined above, said composition comprising:

50% to 99% in weight to the total weigh of the composition (w/w) of at least one biocompatible polymer; preferably selected from polyesters, polyether esters, polyvinyl alcohols (PVA), polyaryletherketones (PAEK) and polyetherimides (PEI); more preferably selected from poly(lactic acid) or poly(lactide) (PLA), poly(glycolic acid) or poly(glycolide) (PGA), poly (lactide-co-glycolide) (PLGA), polycaprolactone (PCL), poly-(D,L)-lactide (PDLLA), polydioxanone (PDO), polyvinylalcohol (PVA), polyetheretherketones (PEEK), polyetherketoneketones (PEKK), polyetherimides (PEI) and any mixtures thereof; more preferably PLGA or PEEK; provided that said biocompatible polymer is not shaped into a three-dimensional material; and 1% to 50% of tricalcium silicate.

According to one embodiment, the composition of the invention is under the form of rods, pellets or granules.

The present invention also concerns a method for manufacturing a filament as defined above, said method comprising:

feeding an extruder coupled to a capillary die with a composition as defined above, preferably a single screw extruder couple to a capillary die having a diameter ranging from 1 mm to 5 mm;

extruding the filament at a temperature ranging from 50° C. to 250° C., preferably from 90° C. to 200° C.; and at a speed ranging from 5 mm/s to 150 mm/s; preferably from 10 mm/s to 100 mm/s.

The present invention also concerns the use of a filament as defined above for 3D printing; preferably for 3D printing using a fused filament deposition printer.

The present invention also concerns a shaped body obtained by 3D printing using a fused filament deposition printer fed with a filament as defined above.

The present invention also concerns a bone substitute comprising a shaped body as defined above.

The present invention also concerns the use of the filament as defined above, of the filament coil as defined above, or of the composition as defined above, for the manufacturing of bone substitutes.

DETAILED DESCRIPTION

Figure 1:
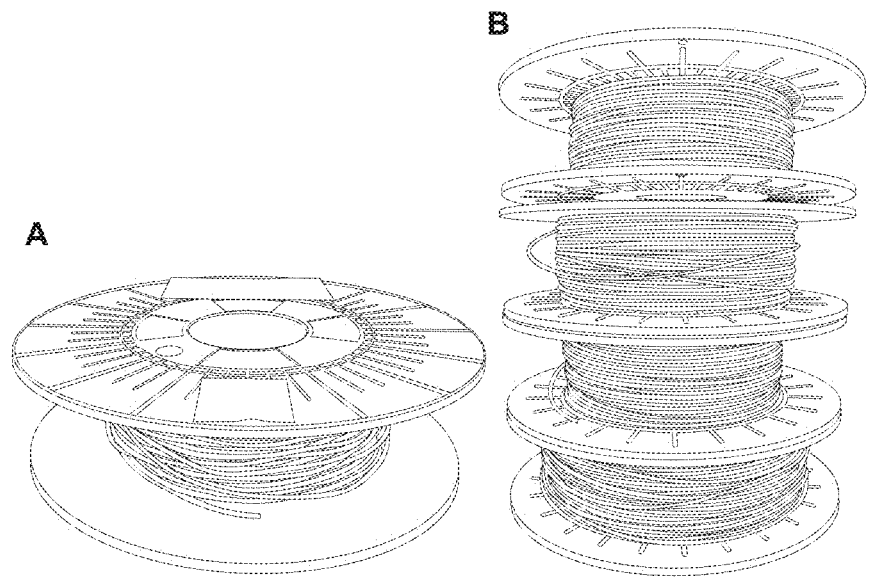
FIG. 1A is a photograph showing a filament of the invention (PLGA with 30% C3S) wrapped around a coil.
FIG. 1B is a photograph showing a filament of the invention (PEEK with (from bottom to top) 0%, 10%, 20% and 30% C3S) wrapped around a coil.

In the present invention, the following terms have the following meanings:

"About" preceding a figure means plus or less 10% of the value of said figure.

"Biocompatible": refers to any material eliciting little or no immune response in a given organism, or is able to integrate with a particular cell type or tissue.

"Biodegradable": refers to materials that are bioresorbable and/or degrade and/or break down by mechanical degradation upon interaction within a physiological environment into components that are metabolizable or excretable.

"Bone": refers to rigid organs that constitute part of the endoskeleton of vertebrates. For instance, the term "bone" encompasses bone, mandibular bone, spongious bone, cortical bone and membranous bone.

"Bone substitute" refers to any material of human, vegetable or synthetic origin suitable to be implanted in human body needed a bone restoration either by strengthening a bone structure, or by filling a bone loss of traumatic and/or orthopedic origin.

"3D-printing" or "additive manufacturing": refers to any process for manufacturing three-dimensional solid objects from a digital file.

"Filament" refers to a thin wire. Especially, the term "filament" refers to a thin wire having a diameter ranging from more than 0 mm to about 10 mm.

"Fused deposition modeling (FDM)" or "fused filament deposition (FFD)" or "fused filament fabrication (FFF)": refers to an additive manufacturing technique comprising a printing plate on which is printed the object, a filament coil which serves as printing material and an extrusion head also called extruder; said technique comprising melting and extruding the filament which is then deposited layer by layer on the printing plate to gradually form the object.

"PAEK" or "polyaryletherketones" refers to a family of semi-crystalline thermoplastic polymers comprising a sequence of very stable aromatic rings (noted "Ar") made up of phenylene rings, substituted or not, joined by oxygen atom (aromatic ether Ar—O—Ar) and/or a carbonyl group (aromatic ketone: Ar—CO—Ar). The PAEK family includes polyetheretherketones (PEEK) and polyetherketoneketones (PEKK).

"PCL" or "poly(caprolactone)": refers to any polymer obtained from the polymerization of caprolactone.

"PDLLA" or "poly(D,L-lactid acid)" or "poly(D,L-lactide)": refers to any polymer obtained from the polymerization of a racemic mixture of D- and L-lactide, or from the polymerization of a racemic mixture of D- and L-lactic acid.

"PDO" or "polydioxanone": refers to any polymer obtained by the ring-opening polymerization of p-dioxanone.

"PEEK" or "polyetheretherketones" refers to a family of semi-crystalline thermoplastic polymers belonging to PAEK as defined above, and in which the repetition unit is based on the following sequence (—O—Ar—O—Ar—CO—Ar—) wherein Ar represents an aryl group, substituted or not; O is an oxygen atom and CO is a carbonyl function.

"PEKK" or "polyetherketoneketones" refers to a family of semi-crystalline thermoplastic polymers belonging to PAEK as defined above, and in which the repetition unit is based on the following sequence (—O—Ar—CO—Ar—CO—Ar—) wherein Ar represents an aryl group, substituted or not; O is an oxygen atom and CO is a carbonyl function.

"PEI" or "polyetherimide" refers to any polymers in which the repetition unit comprises both imide and ether bonds.

"PGA" or "poly(glycolic acid)" or "poly(glycolide)": refers to any polymer obtained from the polymerization of either glycolic acid or the cyclic ester diester glycolide.

"PLGA" or "poly(lactic acid-co-glycolic acid)" or "poly(lactide-co-glycolide)": refers to any polymer obtained from the copolymerization of glycolide and lactide, or from the copolymerization of glycolic acid and lactic acid.

"Polymer": refers to any chain or material having a high molecular weight and resulting from the multiple repetition of one or more repeating unit (monomer), said monomers being covalently linked to each other.

"Polymeric matrix": refers to any network comprising or consisting of a polymer.

"PVA" or "poly(vinyl alcohol)": refers to a polymer of the following formula —$(CH_2$—$CH(OH))_n$— wherein n is a positive integer higher than 2. PVA is obtained from basic hydrolysis of poly(vinyl acetate).

"Tricalcium silicate": refers to the chemical compound of formula $Ca_3SiO_5$.

Filament

This invention relates to a material, preferably to a filament of matter. According to one embodiment, the invention relates to a filament for 3D-printing.

According to one embodiment, the filament comprises or consists of a polymeric matrix and a mineral compound. According to one embodiment, the filament for 3D printing comprises or consists of a polymeric matrix and a mineral compound.

According to one embodiment, the filament of the invention is moisture-free. According to one embodiment, the moisture free-filament comprises non-hydrated calcium silicate, preferably non-hydrated tricalcium silicate.

According to one embodiment, the filament of the invention does not comprise any pores. According to one embodiment, the filament of the invention does not comprise any porous polymeric matrix. According to one embodiment, the filament of the invention is not obtained from a composition comprising a porous and/or hardened polymeric matrix. According to one embodiment, the polymeric matrix inside the filament of the invention is under a hardened form only when shaped into a filament. According to one embodiment, the polymeric matrix is under the form of a non-hardened polymeric matrix when initially mixed with calcium silicate in the composition of the invention; and under a hardened form when the composition of the invention is shaped into a filament.

Polymeric Matrix

According to one embodiment, the polymeric matrix comprises or is made of at least one polymer; preferably comprises or is made of at least one biocompatible and/or bioresorbable polymer. According to one embodiment, the polymeric matrix is moisture-free. According to one embodiment, the polymeric matrix is dried by any drying techniques well-known by the skilled artisan, before being used as raw material and/or being shaped under the form of a filament.

According to one embodiment, the polymeric matrix comprises or is made of non-bioresorbable and/or biocompatible polymer. According to one embodiment, the polymeric matrix comprises or is made of a mixture of bioresorbable polymer and non-bioresorbable polymer.

According to one embodiment, the polymeric matrix comprises or is made of at least one biocompatible polymer selected from polyesters, polyether esters, polyvinyl alcohols (PVA), polyetheretherketones (PEEK), polyetherketoneketones (PEKK) and polyetherimide (PEI).

According to one embodiment, the polymeric matrix comprises or is made of at least one biocompatible polymer selected from polyesters such as poly(lactic acid) (PLA), poly-(D,L)-lactide (PDLLA), poly(glycolic acid) (PGA), poly(lactide-co-glycolide) (PLGA) or polycaprolactone (PCL); polyether esters such as polydioxanone (PDO); polyvinyl alcohols (PVA); polyaryletherketones (PAEK) such as polyetheretherketones (PEEK) or polyetherketoneketones (PEKK); and polyetherimide (PEI).

According to one embodiment, the polymer is selected from polyesters and/or polymers of ether-ester units (called "poly(ether esters)").

According to one embodiment, the polymer is selected from polyesters, preferably from aliphatic polyesters, more preferably from thermoplastic aliphatic polyesters.

According to one embodiment, the polymer is an aliphatic polyester. According to one embodiment, the polymer is an aliphatic polyester obtained by a polycondensation reaction between monomers having a diol function and monomers having two functions carboxylic acid. According to one embodiment, the polymer is an aliphatic polyester obtained by a ring-opening polymerization reaction of lactones (such as for example, but not limited to, lactide, glycolide or caprolactone). According to one embodiment, the aliphatic polyester is a poly(alpha-hydroxacid), preferably selected from poly(lactic acid), poly(glycolid acid) or any copolymers thereof. According to one embodiment, the aliphatic polyester is a poly(beta-hydroxalkanoate), preferably selected from poly(3-hydroxybutyurate) (PHB), poly(3-hydroxyvalerate) (PHV) or any copolymers thereof.

According to one embodiment, the polyester is selected from poly(lactic acids) or poly(lactides), poly(glycolic acids) or poly(glycolides), polyhydroxyalcanoates (PHA), polyhydroxybutyrates (PHB), polycaprolactones (PCL), polyesteramids and any copolymers thereof; preferably, the polyester is poly(lactic acid) (PLA), poly-(D,L)-lactide (PDLLA), poly(glycolic acid) (PGA), poly(lactide-co-glycolide) (PLGA) or polycaprolactone (PCL).

According to one embodiment, the polymer is a polymer of ether-ester units, preferably is a polydioxanone (PDO), more preferably is poly(p-dioxane).

According to one embodiment, the polymer is obtained by polycondensation or by ring-opening polymerization.

According to one embodiment, the polymer is polyvinyl-alcohol (PVA).

According to one embodiment, the polymeric matrix is made of at least one biocompatible and/or bioresorbable polymer; preferably selected from poly(lactic acid) or poly(lactide) (PLA), poly(glycolic acid) or poly(glycolide) (PGA), poly(lactide-co-glycolide) (PLGA), polycaprolactone (PCL), poly-(D,L)-lactide (PDLLA), polydioxanone (PDO), polyvinylalcohol (PVA) or any mixtures thereof; preferably PLGA.

According to one embodiment, the non-bioresorbable and biocompatible polymer is selected from polyetheretherketones (PEEK), polyetherketoneketones (PEKK) and polyetherimide (PEI). According to one embodiment, the polyetherimide (PEI) is the product ULTEM™ AMHU1010F, manufactured by SABIC Innovative Plastics.

According to one embodiment, the polymeric matrix does not comprise or is not made of a polymer selected from: polysaccharides, glycosaminoglycans, polypeptides and proteins. According to one embodiment, the polymeric matrix does not comprise or is not made of a polymer selected from: chitosan, chitin, alginate, collagen, hyaluronic acid, gelatin or any copolymers thereof.

According to one embodiment, the polymeric matrix is not porous. According to one embodiment, the polymeric matrix in the composition is a continuous phase, preferably a continuous phase, liquid or pasty, in which calcium silicate, preferably under the form of particles, are dispersed. According to one embodiment, the polymeric matrix in the composition is a continuous phase, liquid or pasty, in which calcium silicate, preferably under the form of particles, are homogenously dispersed.

According to one embodiment, the polymer of the polymeric matrix has a weight average molecular weight (Mw) ranging from 4,000 g/mol to 240,000 g/mol. According to one embodiment, the polymer of the polymeric matrix has a number average molecular weight (Mn) ranging from 4,000 g/mol to 240,000 g/mol.

Mineral Compound

According to one embodiment, the mineral compound is a silicate, preferably a calcium silicate, more preferably selected from tricalcium silicate, dicalcium silicate or any mixtures thereof, more preferably is tricalcium silicate.

According to one embodiment, the mineral compound is a non-modified calcium silicate, preferably a non-hydrated calcium silicate, more preferably a non-hydrated tricalcium silicate. According to one embodiment, the calcium silicate is dried by any drying techniques well-known by the skilled artisan, before being used as raw material and/or being shaped under the form of a filament.

According to one embodiment, calcium silicate is tricalcium silicate (C3S). According to one embodiment, tricalcium silicate is selected from compound of formula $Ca_3SiO_5$ (also noted as "C3S"). According to one embodiment, dicalcium silicate is compound of formula $Ca_2SiO_4$ (also noted as "C2S"). According to one embodiment, the filament of the invention comprises tricalcium silicate, preferably a mixture of tricalcium silicate and dicalcium silicate. According to one embodiment, the filament of the invention further comprises Portland cement and/or mineral trioxide aggregate (MTA).

According to one embodiment, the calcium silicate, preferably tricalcium silicate and/or dicalcium silicate, may be the calcium silicate present in a Portland cement and/or in mineral trioxide aggregate (MTA).

According to one embodiment, the mineral compound is under the form of particles. According to one embodiment, the mineral compound may be under the form of any suitable form well-known by the skilled artisan. According to one embodiment, the filament of the invention comprises or consists of a polymeric matrix and calcium silicate particles. According to one embodiment, the filament of the invention comprises or consists of a polymeric matrix and tricalcium silicate particles. According to one embodiment, the filament of the invention comprises or consists of a polymeric matrix and calcium silicate under any suitable form well-known by the skilled artisan.

According to one embodiment, the particles can be characterized by their particle size distribution, especially by their $d_{10}$, $d_{50}$ and/or $d_{90}$ sizes. According to one embodiment, the $d_{10}$, $d_{50}$ and $d_{90}$ sizes are measured by laser diffraction.

According to one embodiment, the particle size of the particles is suitable to be used in a 3D-printer without clogging its outlet nozzle.

According to one embodiment, the particles have a $d_{90}$ size ranging from 0.1 µm to less than 200 µm, preferably from 1 µm to less than 200 µm, from 10 µm to less than 200 µm, from 20 µm to less than 200 µm, from 30 µm to less than 200 µm, from 40 µm to less than 200 µm, from 50 µm to less than 200 µm, from 60 µm to less than 200 µm, from 70 µm to less than 200 µm, from 80 µm to less than 200 µm, from 90 µm to less than 200 µm, from 100 µm to less than 200 µm, from 110 µm to less than 200 µm, from 120 µm to less than 200 µm, from 130 µm to less than 200 µm, from 140 µm to less than 200 µm, from 150 µm to less than 200 µm, from 160 µm to less than 200 µm, from 170 µm to less than 200 µm, from 180 µm to less than 200 µm, or from 190 µm to less than 200 µm.

According to one embodiment, the particles have a $d_{90}$ size ranging from 0.1 µm to 190 µm, preferably from 0.1 µm to 190 µm, from 0.1 µm to 180 µm, from 0.1 µm to 170 µm, from 0.1 µm to 160 µm, from 0.1 µm to 150 µm, from 0.1 µm to 140 µm, from 0.1 µm to 130 µm, from 0.1 µm to 120 µm, from 0.1 µm to 110 µm, from 0.1 µm to 100 µm, from 0.1 µm to 90 µm, from 0.1 µm to 80 µm, from 0.1 µm to 70 µm, from 0.1 µm to 60 µm, from 0.1 µm to 50 µm, from 0.1 µm to 40 µm, from 0.1 µm to 30 µm, from 0.1 µm to 20 µm, from 0.1 µm to 10 µm, or from 0.1 µm to 1 µm.

According to one embodiment, the particles have a $d_{90}$ size ranging from 1.4 µm to 6.0 µm, preferably from 1.4 to 5.0 µm, more preferably from 1.4 to 3.5 µm. In one embodiment, the particles have a $d_{90}$ size ranging from 1.4 µm to 5.9 µm, from 1.4 µm to 5.8 µm, from 1.4 µm to 5.7 µm, from 1.4 µm to 5.6 µm, from 1.4 µm to 5.5 µm, from 1.4 µm to 5.4 µm, from 1.4 µm to 5.3 µm, from 1.4 µm to 5.2 µm, from 1.4 µm to 5.1 µm, from 1.4 µm to 5.0 µm, from 1.4 µm to 4.9 µm, from 1.4 µm to 4.8 µm, from 1.4 µm to 4.7 µm, from 1.4 µm to 4.6 µm, from 1.4 µm to 4.5 µm, from 1.4 µm to 4.4 µm, from 1.4 µm to 4.3 µm, from 1.4 µm to 4.2 µm, from 1.4 µm to 4.1 µm, from 1.4 µm to 4.0 µm, from 1.4 µm to 3.9 µm, from 1.4 µm to 3.8 µm, from 1.4 µm to 3.7 µm, from 1.4 µm to 3.6 µm, from 1.4 µm to 3.5 µm, from 1.4 µm to 3.4 µm, from 1.4 µm to 3.3 µm, from 1.4 µm to 3.2 µm, from 1.4 µm to 3.1 µm, from 1.4 µm to 3.0 µm, from 1.4 µm to 2.9 µm, from 1.4 µm to 2.8 µm, from 1.4 µm to 2.7 µm, from 1.4 µm to 2.6 µm, from 1.4 µm to 2.5 µm, from 1.4 µm to 2.4 µm, from 1.4 µm to 2.3 µm, from 1.4 µm to 2.2 µm, from 1.4 µm to 2.1 µm, from 1.4 µm to 2.0 µm, from 1.4 µm to 1.9 µm, from 1.4 µm to 1.8 µm, from 1.4 µm to 1.7 µm, from 1.4 µm to 1.6 µm, from 1.4 µm to 1.5 µm.

According to one embodiment, the particles have a $d_{50}$ size ranging from 0.1 µm to less than 200 µm, preferably from 1 µm to less than 200 µm, from 10 µm to less than 200 µm, from 20 µm to less than 200 µm, from 30 µm to less than 200 µm, from 40 µm to less than 200 µm, from 50 µm to less than 200 µm, from 60 µm to less than 200 µm, from 70 µm to less than 200 µm, from 80 µm to less than 200 µm, from 90 µm to less than 200 µm, from 100 µm to less than 200 µm, from 110 µm to less than 200 µm, from 120 µm to less than 200 µm, from 130 µm to less than 200 µm, from 140 µm to less than 200 µm, from 150 µm to less than 200 µm, from 160 µm to less than 200 µm, from 170 µm to less than 200 µm, from 180 µm to less than 200 µm, or from 190 µm to less than 200 µm.

According to one embodiment, the particles have a $d_{50}$ size ranging from 0.1 µm to 190 µm, preferably from 0.1 µm to 190 µm, from 0.1 µm to 180 µm, from 0.1 µm to 170 µm, from 0.1 µm to 160 µm, from 0.1 µm to 150 µm, from 0.1 µm to 140 µm, from 0.1 µm to 130 µm, from 0.1 µm to 120 µm, from 0.1 µm to 110 µm, from 0.1 µm to 100 µm, from 0.1 µm to 90 µm, from 0.1 µm to 80 µm, from 0.1 µm to 70 µm, from 0.1 µm to 60 µm, from 0.1 µm to 50 µm, from 0.1 µm to 40 µm, from 0.1 µm to 30 µm, from 0.1 µm to 20 µm, from 0.1 µm to 10 µm, or from 0.1 µm to 1 µm.

According to one embodiment, the particles have a $d_{50}$ size ranging from 0.7 µm to 2.9 µm, preferably from 0.7 µm to 2.0 µm, preferably from 0.7 µm to 1.5 µm. According to one embodiment, the particles have a $d_{50}$ size ranging from 0.7 µm to 2.8 µm, from 0.7 µm to 2.7 µm, from 0.7 µm to 2.6 µm, from 0.7 µm to 2.5 µm, from 0.7 µm to 2.4 µm, from 0.7 µm to 2.3 µm, from 0.7 µm to 2.2 µm, from 0.7 µm to 2.1 µm, from 0.7 µm to 2.0 µm, from 0.7 µm to 1.9 µm, from 0.7 µm to 1.8 µm, from 0.7 µm to 1.7 µm, from 0.7 µm to 1.6 µm, from 0.7 µm to 1.5 µm, from 0.7 µm to 1.4 µm, from 0.7 µm to 1.3 µm, from 0.7 µm to 1.2 µm, from 0.7 µm to 1.1 µm, from 0.7 µm to 1.0 µm, from 0.7 µm to 0.9 µm, from 0.7 µm to 0.8 µm.

According to one embodiment, the particles have a $d_{10}$ size ranging from 0.1 µm to less than 200 µm, preferably from 1 µm to less than 200 µm, from 10 µm to less than 200 µm, from 20 µm to less than 200 µm, from 30 µm to less than 200 µm, from 40 µm to less than 200 µm, from 50 µm to less than 200 µm, from 60 µm to less than 200 µm, from 70 µm to less than 200 µm, from 80 µm to less than 200 µm, from 90 µm to less than 200 µm, from 100 µm to less than 200 µm, from 110 µm to less than 200 µm, from 120 µm to less than 200 µm, from 130 µm to less than 200 µm, from 140 µm to less than 200 µm, from 150 µm to less than 200 µm, from 160 µm to less than 200 µm, from 170 µm to less than 200 µm, from 180 µm to less than 200 µm, or from 190 µm to less than 200 µm.

According to one embodiment, the particles have a $d_{10}$ size ranging from 0.1 µm to 190 µm, preferably from 0.1 µm to 190 µm, from 0.1 µm to 180 µm, from 0.1 µm to 170 µm, from 0.1 µm to 160 µm, from 0.1 µm to 150 µm, from 0.1 µm to 140 µm, from 0.1 µm to 130 µm, from 0.1 µm to 120 µm, from 0.1 µm to 110 µm, from 0.1 µm to 100 µm, from 0.1 µm to 90 µm, from 0.1 µm to 80 µm, from 0.1 µm to 70 µm, from 0.1 µm to 60 µm, from 0.1 µm to 50 µm, from 0.1 µm to 40 µm, from 0.1 µm to 30 µm, from 0.1 µm to 20 µm, from 0.1 µm to 10 µm, or from 0.1 µm to 1 µm.

According to one embodiment, the particles have a $d_{10}$ size of less than 0.7 µm, preferably ranging from 0.1 µm to 0.7 µm; preferably from 0.2 µm to 0.6 µm; from 0.3 µm to 0.55 µm; from 0.35 µm to 0.50 µm; from 0.40 µm to 0.50 µm.

The particles can also be characterized by the specific area. According to one embodiment, the particles have a specific area, measured by BET (Brunauer, Emmett and Teller technique), ranging from 0.5 to 13 m²/g; preferably from 3 to 9 m²/g; preferably from 4 to 8 m²/g, more preferably from 5 to 7 m²/g. According to one embodiment, the particles have a specific area, measured by BET, ranging from 4 to 11 m²/g, from 5 to 11 m²/g, from 6 to 11 m²/g, from 7 to 11 m²/g, from 8 to 11 m²/g, from 9 to 11 m²/g, from 10 to 11 m²/g. According to one embodiment, the particles have a specific area, measured by BET, ranging from 3 to 9 m²/g; preferably from 3 to 8 m²/g, 3 to 7 m²/g, 3 to 6 m²/g, from 3 to 5 m²/g or 3 to 4 m²/g. According to one embodiment, the particles have a specific area, measured by BET, of about 3, 4, 5, 6, 7, 8, 9, 10 or 11 m²/g.

Characteristics of the Filament

According to one embodiment, the amount of the mineral compound (preferably tricalcium silicate) ranges from 1% to 50%, preferably from 1% to 30%; more preferably from 10% to 20% in weight by the total weight of the filament.

According to one embodiment, the amount of the mineral compound (preferably tricalcium silicate) ranges from 5% to 50%; preferably from 10% to 50%, from 15% to 50%, from 20% to 50%, from 25% to 50%, from 30% to 50%, from 35% to 50%, from 40% to 50% or from 45% to 50% in weight by the total weight of the filament.

According to one embodiment, the amount of the mineral compound (preferably tricalcium silicate) ranges from 1% to 45%; preferably from 1% to 40%, from 1% to 35%, from 1% to 30%, from 1% to 25%, from 1% to 20%, from 1% to 15%, from 1% to 10% or from 1% to 5%, in weight by the total weight of the filament.

According to one embodiment, the amount of the mineral compound (preferably tricalcium silicate) ranges from 5% to 40%, preferably from 10% to 30% in weight by the total weight of the filament.

According to one embodiment, the amount of the mineral compound (preferably tricalcium silicate) is of about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% in weight to the total weight of the filament.

According to one embodiment, the amount of the polymeric matrix ranges from 50% to 99%; preferably from 70% to 99%; more preferably from 80% to 90% in weight by the total weight of the filament.

According to one embodiment, the amount of the polymeric matrix ranges from 55% to 99%; preferably from 60% to 99%, from 65% to 99%, from 70% to 99%, from 75% to 99%, from 80% to 99%, from 85% to 99%, or from 90% to 99% in weight by the total weight of the filament. According to one embodiment, the amount of the polymeric matrix ranges from 50% to 90%; preferably from 50% to 85%, from 50% to 80%, from 50% to 75%, from 50% to 70%, from 50% to 65%, from 50% to 60%, from 50% to 55%, in weight by the total weight of the filament. According to one embodiment, the amount of the polymeric matrix is of about 50%, 51%, 52%, 53%, 54%, 55%, 56%, 57%, 58%, 59%, 60%, 61%, 62%, 63%, 64%; 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%; 98% or 99%, in weight by the total weight of the filament.

According to one embodiment, the filament comprises or consists of:
  50% to 99% w/w of at least one biocompatible polymer, preferably selected from poly(lactide-co-glycolide) (PLGA), polycaprolactone (PCL), poly(D,L)-lactide (PDLLA), polydioxanone (PDO), polyvinylalcohol (PVA) or mixtures thereof; preferably PLGA; and
  1% to 50% w/w of calcium silicate; preferably tricalcium silicate.

According to one embodiment, the filament comprises or consists of:
  50% to 99% w/w of at least one biocompatible polymer, preferably selected from polyesters, polyether esters, polyvinyl alcohols (PVA), polyaryletherketones (PAEK) such as polyetheretherketones (PEEK) or polyetherketoneketones (PEKK), and polyetherimide (PEI), more preferably selected from polyetheretherketone (PEEK), poly(lactide-co-glycolide) (PLGA), polycaprolactone (PCL), poly(D,L)-lactide (PDLLA), polydioxanone (PDO), polyvinylalcohol (PVA) or mixtures thereof; preferably PLGA; and 1% to 50% w/w of calcium silicate; preferably tricalcium silicate.

According to one embodiment, the filament, preferably for 3D printing, comprises or consists of:

70% to 99% w/w of an aliphatic polyesters, preferably selected from PLGA, PDLLA, PDA and PCL; and 1% to 30% w/w of calcium silicate; preferably tricalcium silicate.

According to one embodiment, the filament comprises or consists of:

95% w/w of at least one biocompatible polymer, preferably selected from polyetheretherketone (PEEK), poly (lactide-co-glycolide) (PLGA), polycaprolactone (PCL), poly(D,L)-lactide (PDLLA), polydioxanone (PDO), polyvinylalcohol (PVA) or mixtures thereof; preferably PLGA; and 5% w/w of calcium silicate; preferably tricalcium silicate.

According to one embodiment, the filament, preferably for 3D printing, comprises or consists of:

90% w/w of an aliphatic polyesters, preferably selected from PLGA, PDLLA, PDA and PCL; and 10% w/w of calcium silicate; preferably tricalcium silicate.

According to one embodiment, the filament, preferably for 3D-printing, comprises or consists of:

80% w/w of an aliphatic polyesters, preferably selected from PLGA, PDLLA, PDA and PCL; and 20% w/w of calcium silicate; preferably tricalcium silicate.

According to one embodiment, the filament, preferably for 3D printing, comprises or consists of:

90% w/w of PEEK; and

10% w/w of calcium silicate; preferably tricalcium silicate.

According to one embodiment, the filament, preferably for 3D printing, comprises or consists of:

80% w/w of PEEK; and

20% w/w of calcium silicate; preferably tricalcium silicate.

According to one embodiment, the filament, preferably for 3D printing, comprises or consists of:

70% w/w of PEEK; and

30% w/w of calcium silicate; preferably tricalcium silicate.

According to one embodiment, the filament further comprises at least one additive, preferably selected from radiopacifiers, anti-inflammatory agents, antibacterial agents and ion doping agents. According to one embodiment, the antibacterial agent is chlorhexidine. According to one embodiment, the anti-inflammatory agent is a non-steroidal anti-inflammatory agent, preferably is enoxolone. According to one embodiment, the anti-inflammatory agent is a steroidal anti-inflammatory agent, preferably is corticosteroid, more preferably is dexamethasone.

According to one embodiment, the radiopacifier is selected from zinc oxide, zirconium oxide, yttrium oxide, tin oxide, barium sulfate, tungsten oxide, bismuth oxide and barium oxide; preferably is zirconium oxide.

According to one embodiment, the antibacterial agent is a high temperature resistant antibacterial agent, preferably antibacterial agent resistant to a temperature higher than 40° C.; preferably higher than 50° C., higher than 60° C., higher than 70° C., higher than 80° C., higher than 90° C. or higher than 100° C. According to one embodiment, the antibacterial agent is an antibiotic, preferably selected from penicillin, tobramycin, nitrofurantoin, gentamicin, vancomycin, cefazolin, and tetracyclin. According to one embodiment, the antibacterial agent is selected from penicillin, tobramycin, nitrofurantoin, gentamicin, vancomycin, cefazolin, tetracyclin, chitosan, iodine, copper and silver.

According to one embodiment, the ion-doping agent is selected from strontium-doping agent, magnesium-doping agent, silicon-doping agent, zinc-doping agent, iodine doping agent, silver doping agent and copper doping agent.

According to one embodiment, the strontium doping agent is a strontium salt, preferably selected from strontium nitrate, strontium hydrogenophosphate and strontium carbonate.

According to one embodiment, the magnesium doping agent is a magnesium salt, preferably selected from magnesium chloride, magnesium carbonate and magnesium nitrate.

According to one embodiment, the silicon-doping agent is an orthosilicate, such as for example but not limited to, tetraethylorthosilicate.

According to one embodiment, the zinc-doping agent is a zinc salt, preferably selected from zinc nitrate, zinc sulphate and zinc chloride.

According to one embodiment, the filament has a mean diameter depending on the extrusion apparatus used during its process of manufacturing, said apparatus being well known by the skilled artisan.

According to one embodiment, the filament has a mean diameter ranging from 1 mm to 10 mm, preferably from 1 to 5 mm; more preferably from 1.5 mm to 2.5 mm. According to one embodiment, the filament has a mean diameter of about 1.75 mm.

According to one embodiment, the filament has a mean diameter ranging from 1 mm to 9 mm, preferably from 1 mm to 8 mm, from 1 mm to 7 mm, from 1 mm to 6 mm, from 1 mm to 5 mm, from 1 mm to 4 mm, from 1 mm to 3 mm, or from 1 mm to 2 mm According to one embodiment, the filament has a mean diameter ranging from 1 mm to 3 mm; preferably from 1.1 mm; 1.2 mm; 1.3 mm; 1.4 mm; 1.5 mm; 1.6 mm; 1.7 mm; 1.8 mm; 1.9 mm; 2.0 mm; 2.1 mm; 2.2 mm; 2.3 mm; 2.4 mm; 2.5 mm; 2.6 mm; 2.7 mm; 2.8 mm; 2.9 mm or 3.0 mm According to one embodiment, the filament has a mean diameter of about 1 mm, 2 mm, 3 mm, 4 mm, 5 mm, 6 mm, 7 mm, 8 mm, 9 mm or 10 mm.

According to one embodiment, the filament of the invention has a Young's modulus ranging from 0.1 GPa to 10 GPa; preferably from 1 GPa to 6 GPa, wherein the Young's modulus is measured by the apparatus MTS Criterion C45. According to one embodiment, the filament of the invention has a Young's modulus of about 0.1 GPa; 0.2 GPa; 0.3 GPa; 0.4 GPa; 0.5 GPa; 0.6 GPa; 0.7 GPa; 0.8 GPa; 0.9 GPa; 1 GPa, 2 GPa, 3 GPa, 4 GPa, 5 GPa, 6 GPa, 7 GPa, 8 GPa, 9 GPa or 10 GPa, wherein the Young's modulus is measured by the apparatus MTS Criterion C45.

According to one embodiment, the filament of the invention has a Young's modulus in the same range as the cortical bone (that-is-to say ranging from 7 GPa to 30 GPa). According to one embodiment, the filament of the invention has a Young's modulus in the same range as the spongious bone (that-is-to say ranging from 0.1 GPa to 4.5 GPa).

According to one embodiment, the filament of the invention has a Young's modulus in the same range as the bone (that-is-to say ranging from 0.1 GPa to 30 GPa), wherein the Young's modulus is measured by the apparatus MTS Criterion C45.

According to one embodiment, the filament of the invention has a tensile strength ranging from 10 MPa to 150 MPa; preferably from 15 MPa to 80 MPa, wherein the tensile strength is measured by the apparatus MTS Criterion C45. According to one embodiment, the filament of the invention has a tensile strength of about 1 MPa, 2 MPa, 3 MPa, 4 MPa, 5 MPa, 6 MPa, 7 MPa, 8 MPa, 9 MPa, 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, 100 MPa, 110 MPa, 120 MPa, 130 MPa, 140 MPa or 150 MPa; wherein the tensile strength is measured by the apparatus MTS Criterion C45.

According to one embodiment, the filament of the invention has a tensile strength in the same range as the cortical bone (that-is-to say ranging from 50 MPa to 150 MPa). According to one embodiment, the filament of the invention has a tensile strength in the same range as the spongious bone (that-is-to say ranging from 10 MPa to 20 MPa). According to one embodiment, the filament of the invention has a tensile strength in the same range as the bone (that-is-to say ranging from 10 MPa to 150 MPa).

According to one embodiment, the filament of the invention has a compressive strength ranging from 1 MPa to 230 MPa; preferably from 2 MPa to 150 MPa, wherein the compressive strength is measured by a tensile tester machine, preferably by the apparatus ZWICK model Z100. According to one embodiment, the filament of the invention has a compressive strength of about 1 MPa, 2 MPa, 3 MPa, 4 MPa, 5 MPa, 6 MPa, 7 MPa, 8 MPa, 9 MPa, 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, 100 MPa, 110 MPa, 120 MPa, 130 MPa, 140 MPa, 150 MPa, 160 MPa, 170 MPa, 180 MPa, 190 MPa, 210 MPa, 220 MPa or 230 MPa; wherein the compressive strength is measured by a tensile tester machine, preferably by the apparatus ZWICK model Z100.

According to one embodiment, the filament of the invention has a compressive strength in the same range as the cortical bone (that-is-to say ranging from 100 MPa to 230 MPa). According to one embodiment, the filament of the invention has a compressive strength in the same range as the spongious bone (that-is-to say ranging from 2 MPa to 12 MPa). According to one embodiment, the filament of the invention has a compressive strength in the same range as the bone (that-is-to say ranging from 2 MPa to 230 MPa).

According to one embodiment, the filament of the invention is biocompatible and/or bioresorbable.

Advantageously, the mineral compound (especially, tricalcium silicate) is homogenously distributed in the filament of the invention, preferably is homogenously distributed on the whole outer surface and/or inside of said filament.

Advantageously, the filament of the invention is non-breakable when stocked under a rolled-up form such as a filament coil. Thus, the invention also relates to a filament coil comprising the filament of the invention, as defined above.

Advantageously, the filament of the invention is printable by an additive manufacture technique such as for example, fused filament deposition.

Composition

The invention also relates to a composition for manufacturing the filament of the invention as defined above.

According to one embodiment, the composition of the invention comprises or consists of at least one polymer as defined above, and a mineral compound as defined above. According to one embodiment, the composition of the invention comprises or consists of at least one polymer as defined above and a mineral compound as defined above; said polymer being under a non-hardened form and/or being not shaped into a three-dimensional material.

According to one embodiment, the composition of the invention comprises or consists of at least one polymeric matrix as defined above, and a mineral compound as defined above. According to one embodiment, the term "composition" refers to a mixture of at least one polymer which is the dispersion medium with calcium silicate particles, preferably tricalcium silicate particles, which are homogeneously dispersed inside the dispersion medium. According to one embodiment, the term "composition" refers to a mixture of: (i) a polymer or a polymeric matrix as defined above, preferably not porous and/or not hardened, said polymeric matrix being the dispersion medium; with (ii) calcium silicate particles, preferably tricalcium silicate particles, which are homogeneously dispersed inside the dispersion medium.

According to one embodiment, the composition of the invention comprises or consists of the mixture of at least one polymer as defined above, and a mineral compound as defined above. According to one embodiment, the composition of the invention does not comprise any mixture of a porous polymeric matrix with calcium silicate such as tricalcium silicate. According to one embodiment, the composition of the invention does not comprise any mixture of a hardened polymer or polymeric matrix with calcium silicate such as tricalcium silicate. According to one embodiment, the composition of the invention does not comprise any mixture of a hardened polymer or polymeric matrix with a solution of calcium silicate such as tricalcium silicate.

According to one embodiment, the composition of the invention does not comprise any mixture of a polymer or polymeric matrix, previously 3D-shaped, with calcium silicate such as tricalcium silicate.

According to one embodiment, the amount of the mineral compound (preferably tricalcium silicate) ranges from 1% to 50%, preferably from 1% to 30%; more preferably from 10% to 20% in weight by the total weight of the composition.

According to one embodiment, the amount of the mineral compound (preferably tricalcium silicate) ranges from 5% to 50%; preferably from 10% to 50%, from 15% to 50%, from 20% to 50%, from 25% to 50%, from 30% to 50%, from 35% to 50%, from 40% to 50% or from 45% to 50% in weight by the total weight of the composition.

According to one embodiment, the amount of the mineral compound (preferably tricalcium silicate) ranges from 1% to 45%; preferably from 1% to 40%, from 1% to 35%, from 1% to 30%, from 1% to 25%, from 1% to 20%, from 1% to 15%, from 1% to 10% or from 1% to 5%, in weight by the total weight of the composition.

According to one embodiment, the amount of the mineral compound (preferably tricalcium silicate) is of about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% in weight to the total weight of the composition.

According to one embodiment, the amount of the polymer ranges from 50% to 99%; preferably from 70% to 99%; more preferably from 80% to 90% in weight by the total weight of the composition.

According to one embodiment, the amount of the polymer ranges from 55% to 99%; preferably from 60% to 99%, from 65% to 99%, from 70% to 99%, from 75% to 99%, from 80% to 99%, from 85% to 99%, or from 90% to 99% in weight by the total weight of the composition. According to one embodiment, the amount of the polymer ranges from 50% to 90%; preferably from 50% to 85%, from 50% to 80%, from 50% to 75%, from 50% to 70%, from 50% to 65%, from 50% to 60%, from 50% to 55%, in weight by the total weight of the composition. According to one embodiment, the amount of the polymer is of about 50%, 51%, 52%, 53%, 54%, 55%, 56%, 57%, 58%, 59%, 60%, 61%, 62%, 63%, 64%; 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%; 98% or 99%, in weight by the total weight of the composition.

According to one embodiment, the composition for manufacturing a filament of the invention, comprises:
  50% to 99% in weight to the total weigh of the composition (w/w) of a biocompatible polymer selected from poly(lactide-co-glycolide) (PLGA), polycaprolactone (PCL), poly-(D,L)-lactide (PDLLA), polydioxanone (PDO), polyvinylalcohol (PVA) or mixtures thereof; and
  1% to 50% of tricalcium silicate.

According to one embodiment, the composition for manufacturing a filament of the invention, comprises:
  50% to 99% in weight to the total weigh of the composition (w/w) of a biocompatible polymer selected from poly(lactide-co-glycolide) (PLGA), polycaprolactone (PCL), poly-(D,L)-lactide (PDLLA), polydioxanone (PDO), polyvinylalcohol (PVA), polyetheretherketones (PEEK), polyetherketoneketones (PEKK) or mixtures thereof; and
  1% to 50% of tricalcium silicate.

According to one embodiment, the composition comprises or consists of:
  70% to 99% w/w of an aliphatic polyester, preferably selected from PLGA, PDLLA, PDA and PCL; and
  1% to 30% w/w of calcium silicate; preferably tricalcium silicate.

According to one embodiment, the composition comprises or consists of:
  70% to 99% w/w of an aliphatic polyester, preferably selected from PLGA, PDLLA, PDA and PCL; or of a polyaryletherketone (PAEK), preferably selected from polyetheretherketones (PEEK) or polyetherketoneketones (PEKK); and
  1% to 30% w/w of calcium silicate; preferably tricalcium silicate.

According to one embodiment, the composition comprises or consists of:
  90% w/w of an aliphatic polyester, preferably selected from PLGA, PDLLA, PDA and PCL; and
  10% w/w of calcium silicate; preferably tricalcium silicate.

According to one embodiment, the composition comprises or consists of:
  90% w/w of an aliphatic polyester, preferably selected from PLGA, PDLLA, PDA and PCL; or of a polyaryletherketone (PAEK), preferably selected from polyetheretherketones (PEEK) or polyetherketoneketones (PEKK); and
  10% w/w of calcium silicate; preferably tricalcium silicate.

According to one embodiment, the composition comprises or consists of:
  80% w/w of an aliphatic polyester, preferably selected from PLGA, PDLLA, PDA and PCL; and
  20% w/w of calcium silicate; preferably tricalcium silicate.

According to one embodiment, the composition comprises or consists of:
  80% w/w of an aliphatic polyester, preferably selected from PLGA, PDLLA, PDA and PCL; or of a polyaryletherketone (PAEK), preferably selected from polyetheretherketones (PEEK) or polyetherketoneketones (PEKK); and
  20% w/w of calcium silicate; preferably tricalcium silicate.

According to one embodiment, the composition further comprises at least one additive, preferably selected from radiopacifiers, antibacterial agents and ion doping agents. According to one embodiment, the composition further comprises dicalcium silicate, tricalcium aluminate, tricalcium oxide, gypsum, a radiopacifier such as zinc oxide, zirconium oxide, yttrium oxide, tin oxide, barium sulfate, tungsten oxide, bismuth oxide or barium oxide; and/or Portland cement.

According to one embodiment, the radiopacifier is selected from zinc oxide, zirconium oxide, yttrium oxide, tin oxide, barium sulfate, tungsten oxide, bismuth oxide and barium oxide; preferably is zirconium oxide.

According to one embodiment, the antibacterial agent is a high temperature resistant antibacterial agent, preferably antibacterial agent resistant to a temperature higher than 40° C.; preferably higher than 50° C., higher than 60° C., higher than 70° C., higher than 80° C., higher than 90° C. or higher than 100° C. According to one embodiment, the antibacterial agent is an antibiotic, preferably selected from penicillin, tobramycin, nitrofurantoin, gentamicin, vancomycin, cefazolin, and tetracyclin. According to one embodiment, the antibacterial agent is selected from penicillin, tobramycin, nitrofurantoin, gentamicin, vancomycin, cefazolin, tetracyclin, chitosan, iodine, copper and silver.

According to one embodiment, the ion-doping agent is selected from strontium-doping agent, magnesium-doping agent, silicon-doping agent, zinc-doping agent, iodine doping agent, silver doping agent and copper doping agent.

According to one embodiment, the strontium doping agent is a strontium salt, preferably selected from strontium nitrate, strontium hydrogenophosphate and strontium carbonate.

According to one embodiment, the magnesium doping agent is a magnesium salt, preferably selected from magnesium chloride, magnesium carbonate and magnesium nitrate.

According to one embodiment, the silicon-doping agent is an orthosilicate, such as for example but not limited to, tetraethylorthosilicate.

According to one embodiment, the zinc-doping agent is a zinc salt, preferably selected from zinc nitrate, zinc sulphate and zinc chloride.

According to one embodiment, the composition is under the form of a paste, rods, pellets or granules.

Advantageously, the composition of the invention is useful for molding or shaping the filament of the invention.

Process for Manufacturing the Filament of the Invention

The invention also relates to a process for manufacturing a filament of matter, preferably for manufacturing the filament as defined above.

According to one embodiment, the process for manufacturing the filament as defined above, comprises using the composition as defined above. According to one embodiment, the process for manufacturing the filament as defined above, is anhydrous or moisture-free.

According to one embodiment, the process for manufacturing the filament as defined above, comprises a step (i) for feeding an extruder with the composition as defined above. According to one embodiment, the extruder is coupled to a capillary die. According to one embodiment, the extruder is a single screw extruder. According to one embodiment, the extruder is a twin-screw extruder. According to one embodiment, the polymeric matrix and the mineral compound are mixed in a twin-screw extruder in order to provide the composition as defined above. According to one embodiment, the polymeric matrix and the mineral compound are mixed under a laminar air flow.

According to one embodiment, for manufacturing the filament of the invention, the composition as defined above is introduced in a single screw extruder. Alternatively, for manufacturing the filament of the invention, the polymeric matrix and the mineral compound are directly mixed in a twin screw extruder or a single screw extruder.

According to one embodiment, the process for manufacturing the filament comprises a preliminary drying step, preferably a drying step of the polymeric matrix and/or the mineral compound before to be used.

According to one embodiment, the process for manufacturing the filament comprises a preliminary step for preparing the composition as defined above.

According to one embodiment, the drying step is carried out at a temperature ranging from 10° C. to 200° C., preferably from 25° C. to 160° C. According to one embodiment, the drying step of the polymeric matrix is carried out at a temperature ranging from 30° C. to 40° C. According to one embodiment, the drying step of the mineral compound is carried out at a temperature of about 150° C.

According to one embodiment, the drying step is carried out at a temperature ranging from 10° C. to 400° C., preferably from 25° C. to 160° C. According to one embodiment, the drying step of the polymeric matrix is carried out at a temperature ranging from 30° C. to 150° C. According to one embodiment, the drying step of the polymeric matrix is carried out at a temperature of about 150° C.

According to one embodiment, the extruder has an outlet diameter ranging from 1 mm to 10 mm, preferably from 1 to 5 mm; more preferably from 1.5 mm to 2.5 mm According to one embodiment, the extruder has an outlet diameter of about 1.75 mm.

According to one embodiment, the extruder has an outlet diameter ranging from 1 mm to 9 mm, preferably from 1 mm to 8 mm, from 1 mm to 7 mm, from 1 mm to 6 mm, from 1 mm to 5 mm, from 1 mm to 4 mm, from 1 mm to 3 mm, or from 1 mm to 2 mm. According to one embodiment, the extruder has an outlet diameter ranging from 1 mm to 3 mm; preferably from 1.1 mm; 1.2 mm; 1.3 mm; 1.4 mm; 1.5 mm; 1.6 mm; 1.7 mm; 1.8 mm; 1.9 mm; 2.0 mm; 2.1 mm; 2.2 mm; 2.3 mm; 2.4 mm; 2.5 mm; 2.6 mm; 2.7 mm; 2.8 mm; 2.9 mm or 3.0 mm According to one embodiment, the extruder has an outlet diameter of about 1 mm, 2 mm, 3 mm, 4 mm, 5 mm, 6 mm, 7 mm, 8 mm, 9 mm or 10 mm.

According to one embodiment, the process for manufacturing the filament as defined above, further comprises a step (ii) for extruding the composition as defined above under the form of a filament.

According to one embodiment, the extrusion step (ii) for providing the filament is carried out at a temperature ranging from 50° C. to 250° C.; preferably from 90° C. to 200° C. According to one embodiment, the extrusion step (ii) for providing the filament is carried out at a temperature ranging from 50° C. to 500° C.; preferably from 90° C. to 400° C.

According to one embodiment, the extrusion step (ii) is carried out at a temperature ranging from preferably from 50° C. to 240° C., from 50° C. to 230° C., from 50° C. to 230° C., from 50° C. to 220° C., from 50° C. to 210° C., from 50° C. to 200° C., from 50° C. to 190° C., from 50° C. to 180° C., from 50° C. to 170° C., from 50° C. to 160° C., from 50° C. to 150° C., from 50° C. to 140° C., from 50° C. to 130° C., from 50° C. to 120° C., from 50° C. to 110° C., from 50° C. to 100° C., from 50° C. to 90° C., from 50° C. to 80° C., from 50° C. to 70° C., or from 50° C. to 60° C. According to one embodiment, the extrusion step (ii) is carried out at a temperature ranging from 60° C. to 250° C.; preferably from 70° C. to 240° C., from 80° C. to 240° C., from 90° C. to 240° C., from 100° C. to 240° C., from 110° C. to 240° C., from 120° C. to 240° C., from 130° C. to 240° C., from 140° C. to 240° C., from 150° C. to 240° C., from 160° C. to 240° C., from 170° C. to 240° C., from 180° C. to 240° C., from 190° C. to 240° C., from 200° C. to 240° C., from 210° C. to 240° C., from 220° C. to 240° C., or from 230° C. to 240° C.

According to one embodiment, the extrusion step (ii) is carried out at a temperature ranging from 50° C. to 450° C.; preferably from 50° C. to 400° C., from 50° C. to 390° C., from 50° C. to 380° C., from 50° C. to 370° C., from 50° C. to 360° C., from 50° C. to 350° C., from 50° C. to 340° C., from 50° C. to 330° C., from 50° C. to 320° C., from 50° C. to 310° C., from 50° C. to 300° C., from 50° C. to 290° C., from 50° C. to 280° C., from 50° C. to 270° C., from 50° C. to 260° C. or from 50° C. to 250° C. According the extrusion step (ii) is carried out at a temperature ranging from 60° C. to 450° C., preferably from 70° C. to 450° C., from 80° C. to 450° C., from 90° C. to 450° C., from 100° C. to 450° C., from 110° C. to 450° C., from 120° C. to 450° C., from 130° C. to 450° C., from 140° C. to 450° C., from 150° C. to 450° C., from 160° C. to 450° C., from 170° C. to 450° C., from 180° C. to 450° C., from 190° C. to 450° C., from 200° C. to 450° C., from 210° C. to 450° C., from 220° C. to 450° C., from 230° C. to 450° C., from 240° C. to 450° C., from 250° C. to 450° C., from 260° C. to 450° C., from 270° C. to 450° C., from 280° C. to 450° C., from 290° C. to 450° C., from 300° C. to 450° C., from 310° C. to 450° C., from 320° C. to 450° C., from 330° C. to 450° C., from 340° C. to 450° C., from 350° C. to 450° C., from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C. or from 440° C. to 450° C.

According to one embodiment, the extrusion step (ii) is carried out at a speed ranging from 5 mm/s to 150 mm/s; preferably from 10 mm/s to 100 mm/s. According the extrusion step (ii) is carried out at a speed ranging from 10 mm/s to 150 mm/s; preferably from 20 mm/s to 150 mm/s, from 30 mm/s to 150 mm/s, from 40 mm/s to 150 mm/s, from 50 mm/s to 150 mm/s, from 60 mm/s to 150 mm/s, from 70 mm/s to 150 mm/s, from 80 mm/s to 150 mm/s, from 90 mm/s to 150 mm/s, from 100 mm/s to 150 mm/s, from 110 mm/s to 150 mm/s, from 120 mm/s to 150 mm/s, from 130 mm/s to 150 mm/s, or from 140 mm/s to 150 mm/s.

According to one embodiment, the extrusion step (ii) is carried out at a speed ranging from 5 mm/s to 140 mm/s; preferably from 5 mm/s to 130 mm/s, from 5 mm/s to 120 mm/s, from 5 mm/s to 110 mm/s, from 5 mm/s to 100 mm/s, from 5 mm/s to 90 mm/s, from 5 mm/s to 80 mm/s, from 5 mm/s to 70 mm/s, from 5 mm/s to 60 mm/s, from 5 mm/s to 50 mm/s, from 5 mm/s to 40 mm/s, from 5 mm/s to 30 mm/s, from 5 mm/s to 20 mm/s or from 5 mm/s to 10 mm/s.

Process for Shaping an Object (Molding or 3D Printing)

The invention also relates to a process for shaping an object; preferably for shaping an implant; more preferably a bone substitute.

According to one embodiment, the process for shaping an object comprises using the filament or the composition as defined above.

According to one embodiment, the process for shaping an object further comprises using molding and/or an additive manufacture technique, preferably fused filament deposition.

According to one embodiment, the process for shaping an object comprises or consists of:
feeding a 3D printer with a filament coil comprising the filament of the invention;
defining the print speed and the print time of the 3D printer for shaping the targeted object; and/or
implemented 3D-printing of the targeted object.

According to one embodiment, the process for shaping an object further comprises virtual modeling the object to be printed ("targeted object"). According to one embodiment, the virtual modeling of the targeted object may be carried out by any scanning technique known by the skilled artisan.

According to one embodiment, 3D printing may be implemented by any additive manufacturing technique known by the skilled artisan including, but not limited to, stereolithography (SLA), fused filament deposition (FFD), digital light processing (DLP), continuous liquid interface production (CLIP), direct metal laser sintering (DMLS), electron beam melting (EBM), binder jetting (BJ), laminated object manufacturing (LOM) and triple-jetting technology (PolyJet).

According to one embodiment, 3D printing step is implemented to a temperature ranging from −30° C. to 250° C.; preferably from −20° C. to 250° C., −10° C. to 250° C., 0° C. to 250° C., −10° C. to 250° C., 20° C. to 250° C., 30° C. to 250° C., 40° C. to 250° C., 50° C. to 250° C., 60° C. to 250° C., 70° C. to 250° C., 80° C. to 250° C., 90° C. to 250° C., 100° C. to 250° C., 110° C. to 250° C., 120° C. to 250° C., 130° C. to 250° C., 140° C. to 250° C., 150° C. to 250° C., 160° C. to 250° C., 170° C. to 250° C., 180° C. to 250° C., 190° C. to 250° C., 200° C. to 250° C., 210° C. to 250° C., 220° C. to 250° C., 230° C. to 250° C., or 230° C. to 250° C.; preferably from −30° C. to 240° C., −30° C. to 230° C., −30° C. to 220° C., −30° C. to 210° C., −30° C. to 200° C., −30° C. to 190° C., −30° C. to 180° C., −30° C. to 170° C., −30° C. to 160° C., −30° C. to 150° C., −30° C. to 140° C., −30° C. to 130° C., −30° C. to 120° C., −30° C. to 110° C., −30° C. to 100° C., −30° C. to 90° C., −30° C. to 80° C., −30° C. to 70° C., −30° C. to 60° C., −30° C. to 50° C., −30° C. to 40° C., −30° C. to 30° C., −30° C. to 20° C., −30° C. to 10° C., or −30° C. to 0° C.

According to one embodiment, 3D printing step of a filament comprising PLGA, PDLLA and/or PVA is implemented to a temperature ranging from 190° C. to 210° C. According to one embodiment, 3D printing step of a filament comprising PDO is implemented to a temperature ranging from 170° C. to 190° C. According to one embodiment, 3D printing step of a filament comprising PCL is implemented to a temperature ranging from 60° C. to 90° C.

According to one embodiment, the print speed depends on the additive manufacture technique used. According to one embodiment, 3D printing step is implemented at a print speed ranging from more than 0 mm/h to 200 mm/h, preferably for SLS, SLA or FFD technique. According to one embodiment, 3D printing step is implemented at a print speed ranging from 10 mm/h to 200 mm/h, preferably from 20 mm/h to 200 mm/h, 20 mm/h to 200 mm/h, 30 mm/h to 200 mm/h, 40 mm/h to 200 mm/h, 50 mm/h to 200 mm/h, 60 mm/h to 200 mm/h, 70 mm/h to 200 mm/h, 80 mm/h to 200 mm/h, 90 mm/h to 200 mm/h, 100 mm/h to 200 mm/h, 110 mm/h to 200 mm/h, 120 mm/h to 200 mm/h, 130 mm/h to 200 mm/h, 140 mm/h to 200 mm/h, 150 mm/h to 200 mm/h, 160 mm/h to 200 mm/h, 170 mm/h to 200 mm/h, 180 mm/h to 200 mm/h, or 190 mm/h to 200 mm/h; preferably from 10 mm/h to 190 mm/h, 10 mm/h to 180 mm/h, 10 mm/h to 170 mm/h, 10 mm/h to 160 mm/h, 10 mm/h to 150 mm/h, 10 mm/h to 140 mm/h, 10 mm/h to 130 mm/h, 10 mm/h to 120 mm/h, 10 mm/h to 110 mm/h, 10 mm/h to 100 mm/h, 10 mm/h to 90 mm/h, 10 mm/h to 80 mm/h, 10 mm/h to 70 mm/h, 10 mm/h to 60 mm/h, 10 mm/h to 50 mm/h, 10 mm/h to 40 mm/h, 10 mm/h to 30 mm/h, or 10 mm/h to 20 mm/h. According to one embodiment, 3D printing step is implemented at a print speed of about 5, 10, 15, 20, 25, 30, 35, 40, 45, 50, 55, 60, 65, 70, 75, 80, 85, 90, 95, 100, 110, 120, 130, 140, 150, 160, 170, 180, 190 or 200 mm/h.

According to one embodiment, 3D printing step of filament comprising PLGA and/or PDLLA is implemented at a print speed ranging from 50 mm/s to 100 mm/s. According to one embodiment, 3D printing step of filament comprising PVA, PDO and/or PCL is implemented at a print speed ranging from 10 mm/s to 30 mm/s.

Alternatively, the process for shaping an object comprises or consists of molding the filament of the invention or directly using the composition of the invention. Alternatively, the process for shaping an object comprises or consists of weaving the filaments of the invention.

Object Obtained by the Process

The invention also relates to a shaped object; preferably a shaped implant; more preferably a shaped bone substitute or a shaped dental substitute. According to one embodiment, the shaped object is a dental crown. According to one embodiment, the shaped object is an inlay. According to one embodiment, the shaped object is an onlay.

According to one embodiment, the shaped object is obtainable by the process of the invention as defined above, using the filament of the invention.

According to one embodiment, the shaped object has a Young's modulus in the same range as the spongious bone (that-is-to say ranging from 0.1 GPa to 4.5 GPa).

According to one embodiment, the shaped object has a tensile strength ranging from 10 MPa to 150 MPa; preferably from 15 MPa to 80 MPa, wherein the tensile strength is measured by the apparatus MTS Criterion C45. According to one embodiment, the shaped object has a tensile strength of about 1 MPa, 2 MPa, 3 MPa, 4 MPa, 5 MPa, 6 MPa, 7 MPa, 8 MPa, 9 MPa, 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, 100 MPa, 110 MPa, 120 MPa, 130 MPa, 140 MPa or 150 MPa; wherein the tensile strength is measured by the apparatus MTS Criterion C45.

According to one embodiment, the shaped object has a tensile strength in the same range as the cortical bone (that-is-to say ranging from 50 MPa to 150 MPa). According to one embodiment, the shaped object has a tensile strength in the same range as the spongious bone (that-is to say ranging from 10 MPa to 20 MPa). According to one embodiment, the shaped object has a tensile strength in the same range as the bone (that-is-to say ranging from 10 MPa to 150 MPa).

According to one embodiment, the shaped object has a compressive strength ranging from 1 MPa to 230 MPa; preferably from 2 MPa to 150 MPa, wherein the compressive strength is measured by the apparatus ZWICK model Z100. According to one embodiment, the shaped object has a compressive strength of about 1 MPa, 2 MPa, 3 MPa, 4 MPa, 5 MPa, 6 MPa, 7 MPa, 8 MPa, 9 MPa, 10 MPa, 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, 100 MPa, 110 MPa, 120 MPa, 130 MPa, 140 MPa, 150 MPa, 160 MPa, 170 MPa, 180 MPa, 190 MPa, 210 MPa, 220 MPa or 230 MPa; wherein the compressive strength is measured by the apparatus ZWICK model Z100.

According to one embodiment, the shaped object has a compressive strength in the same range as the cortical bone (that-is-to say ranging from 100 MPa to 230 MPa). According to one embodiment, the shaped object has a compressive strength in the same range as the spongious bone (that-is-to say ranging from 2 MPa to 12 MPa). According to one embodiment, the shaped object has a compressive strength in the same range as the bone (that-is-to say ranging from 2 MPa to 230 MPa).

According to one embodiment, the shaped object is biocompatible and/or bioresorbable.

Uses

The invention also relates to the use of the filament, the composition or the filament coil of the invention, as defined herein above.

According to one embodiment, the filament, the composition or the filament coil of the invention is useful for shaping or for manufacturing an object; preferably an implant; more preferably a bone substitute or a dental substitute. According to one embodiment, the filament, the composition or the filament coil of the invention is useful for shaping or for manufacturing a dental crown.

According to one embodiment, the filament, the composition or the filament coil of the invention is useful for 3D printing; preferably for 3D printing using a fused filament deposition printer.

According to one embodiment, the filament, the composition or the filament coil of the invention is useful for molding an object.

The invention also relates to a shaped body obtained by 3D printing using a printer (preferably a fused filament deposition printer) fed with the filament or the filament coil as defined above.

The invention also relates to a bone substitute comprising or consisting of a shaped body as defined above.

EXAMPLES

The present invention is further illustrated by the following examples.

Abbreviations

3D: three-dimension,
C3S: tricalcium silicate,
° C.: Celsius degree,
PBS: phosphate buffer saline,
PCL: polycaprolactone,
PDLLA: poly(D, L-lactide),
PDO: polydioxanone,
PEEK: polyetheretherketone,
PLGA: poly(lactide-co-glycolide),
PVA: polyvinylalcohol,
rpm: road per minute, and
TGA: thermogravimetric analysis.

Part I: Chemistry

Example 1: Process for Manufacturing Non-Breaking and 3D Printable Filaments

General Protocol

First, C3S, under the form of particles or any other suitable form well-known by the skilled artisan, are dried for 2 hours at 150° C. and polymer is dried at least 2 hours under vacuum at a temperature ranging from 30° C. to 150° C. Then, the polymer and C3S are mixed in a twin screw extruder (apparatus: PHARMA 11 of Thermo Scientific) under laminar air flow to limit moisture intake (25° C. and 30% relative humidity). Finally, extrusion is implemented at a rate ranging from 5 rpm to 25 rpm and at a temperature ranging from 90° C. to 400° C. The diameter of the outlet filament is checked throughout the extrusion process. Starting from the temperature ranges given in this general protocol, the skilled artisan would be able to adapt the drying temperature and the extrusion temperature depending on the selected polymer(s).

This general protocol was implemented for manufacturing filaments of PEEK, PLGA, PVA, PCL, PDLLA or PDO, loaded with a C3S amount (1%, 5%, 10%, 20%, 30% or 50% in weight to the total weight of the filament). A TGA analysis confirms the C3S load for each filament obtained by the process of the invention.

According to the general protocol as described above, additional ingredients may be added when the polymer and C3S are mixed in a twin screw extruder. Such additional ingredients may be for example, dicalcium silicate, tricalcium aluminate, tricalcium oxide, gypsum, a radiopacifier such as zinc oxide, zirconium oxide, yttrium oxide, tin oxide, barium sulfate, tungsten oxide, bismuth oxide or barium oxide; and/or Portland cement.

Example 2: Characterization of the Filaments of the Invention

The filaments obtained from the process described in Example 1 were studied. The aim is to evaluate their pliability and checkup the C3S distribution in the filament.

2.1. Non-Breaking Filament

In general, in the 3D printing field, polymer filaments are pliable and stored under filament coils. However, it is expected that addition of mineral compounds (such as tricalcium silicate) inside such filaments, stiffens the structure leading to the breakage of the filaments. Consequently, such filaments might be stored under coils and a fortiori, not be used in fused filament deposition.

In this experiment, the pliability of the filaments of the invention (loaded with C3S, % given in weight of C3S to the total weight of the filament) was tested. For this purpose, the following filaments were wrapped around a coil and stored until used in 3D printing:

PLGA with 1% C3S,
PLGA with 5% C3S,
PLGA with 10% C3S,

PLGA with 20% C3S,
PDLLA with 30% C3S,
PEEK with 10% C3S,
PEEK with 20% C3S,
PEEK with 30% C3S, and
PCL with 50% C3S.

The results (visible to the naked eye) showed that there is no breakings for all filaments loaded in C3S and wrapped around a coil. FIG. 1A shows an example of a filament coil of the invention made of PLGA with 10% C3S. FIG. 1B shows filaments made of PEEK with (from bottom to top) 0% wt., 10% wt., 20% wt. and 30% wt. of C3S; the PEEK filament without any C3S is used as a reference. Furthermore, the filament coils made of PLGA with 10% C3S were successfully used in 3D printing (see example 3).

2.2. C3S Distribution

The aim is to check up if the distribution of tricalcium silicate inside the filaments is homogenous in view of achieving good biological and physicochemical properties.

In the Raw Filament

First, a microscopy cliché (FIG. 2) has been realized of:
a filament without any C3S load (FIG. 2 on the left); and
filaments of the invention made of PLGA, loaded with 10%, 20% or 30% of C3S (% w/w) respectively.

Figure 2:
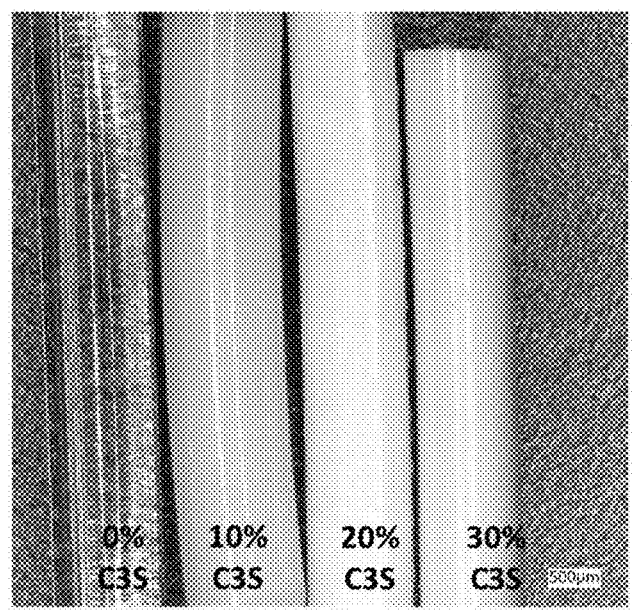
FIG. 2 is a microscopy cliché showing the filament without any C3S load (on the left) and with 10% w/w, 20% w/w or 30% w/w of C3S (from the left to the right).

FIG. 2 shows that a filament without any C3S load is translucent. To the contrary, the filament is more and more opaque when the C3S amount increases. These observations were confirmed by thermogravimetric analysis. The result of FIG. 2 evidences a C3S distribution on the whole outer surface of the filament.

Figure 3:
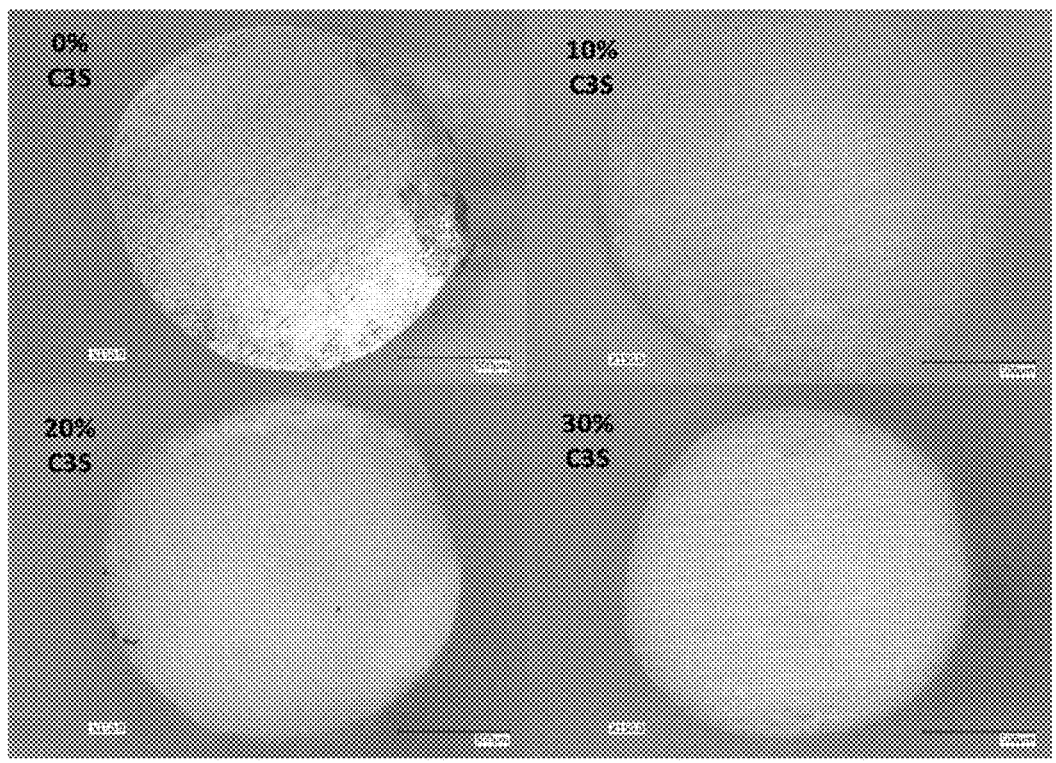
FIG. 3 is a set of microscopy clichés showing the sections of the filaments of FIG. 2.

Microscopy clichés of the sections of these filaments have been realized. The results of FIG. 3 confirm the homogenous distribution of C3S inside the filament of the invention.

Thus, both results evidence the homogenous distribution of C3S inside the filaments.

On the Filament after its Immersion in a PBS Solution

Figure 4:
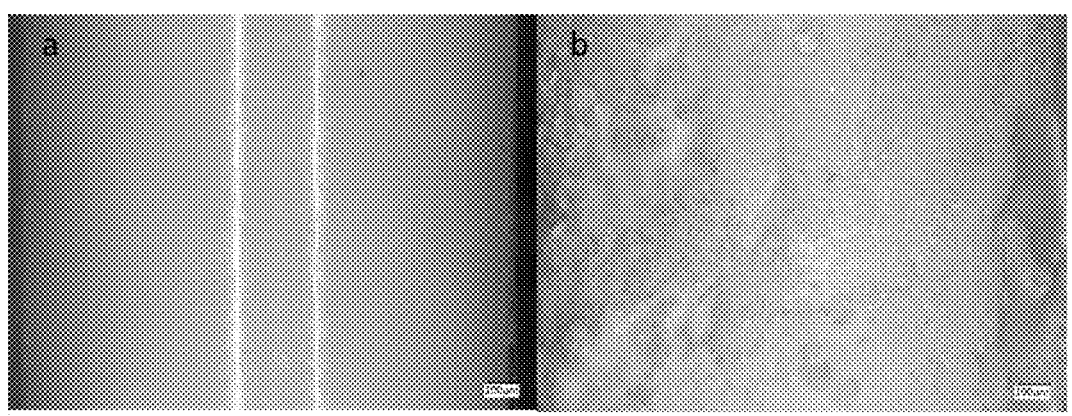
FIG. 4 is a set of microscopy clichés showing a filament of the invention (PLGA with 30% C3S) before (FIG. 4a) and after (FIG. 4b) two weeks immersed in a PBS solution.

Then, the filaments of the invention (with a C3S load) have been placed in a PBS solution during 2 weeks, at 37° C. FIG. 4a shows a cliché of a filament of the invention (PLGA with 30% C3S) before its immersion in the PBS solution and FIG. 4b shows the same filament after two weeks in the PBS solution.

FIG. 4b shows the presence of crystals on the whole surface of the filament. A X-Ray analysis of these crystals demonstrated that these crystals are hydroxyapatite resulting from the reaction between phosphate of the PBS solution and the C3S particles present on the loaded filament.

In conclusion, microscopy clichés (FIGS. 4a and b) and X-ray analysis evidence that the process of the invention provides filaments with C3S particles well-distributed in the filament of the invention.

2.3. Others Characteristics of the Filament of the Invention

The aim is to provide filaments for manufacturing bone substitutes either by molding or by 3D printing. For this goal, the filaments must have some mechanical parameters close to those of the cortical or the spongious bones.

In this experiment, the compressive strength, the tensile strength and the Young's modulus of the filaments have been determined and compared to reference value ranges. These reference value ranges ["bone ref."] corresponds to the limit values of cortical and spongious bones.

The results are presented in the following table:

|  | Bone ref. | 10% C3S-loaded PLGA | 20% C3S-loaded PLGA | 30% C3S-loaded PLGA | 30% C3S-loaded PVA | 30% C3S-loaded PCL | 30% C3S-loaded PDLLA | 30% C3S-loaded PDO | 10% C3S-loaded PEEK | 20% C3S-loaded PEEK | 30% C3S-loaded PEEK |
| --- | --- | --- | --- | --- | --- | --- | --- | --- | --- | --- | --- |
| Young's modulus (GPa) | 0.1-30 | 3.9 | 4.3 | 5.2 | 8 | 1.1 | 6 | 1.8 | 5.6 | 6.1 | 6.3 |
| Tensile strength (MPa) | 10-150 | 51.5 | 46.8 | 51.4 | 73 | 17 | 43 | 33 | 76.2 | 76.8 | 76.1 |
| Compressive strength (MPa) | 2-230 | 71.7 | 74 | 86.8 | 142 | 28 | 78 | 53 | 139 | 138 | 156 |

The results show that for all the filaments loaded with C3S, the values of Young's modulus, tensile strength and compressive strength are in the reference value ranges of cortical and spongious bones.

Thus, the filaments of the invention feature mechanical parameters suitable for their use in the manufacture of bone substitutes.

Part II: Uses

Example 3: Manufacturing of an Object by Fused Filament Deposition (FFD)

The filaments of the invention have been used for manufacturing objects by filament fused deposition.

The aim is to finely execute the manufacturing of a shaped object of small dimensions.

Figure 5:
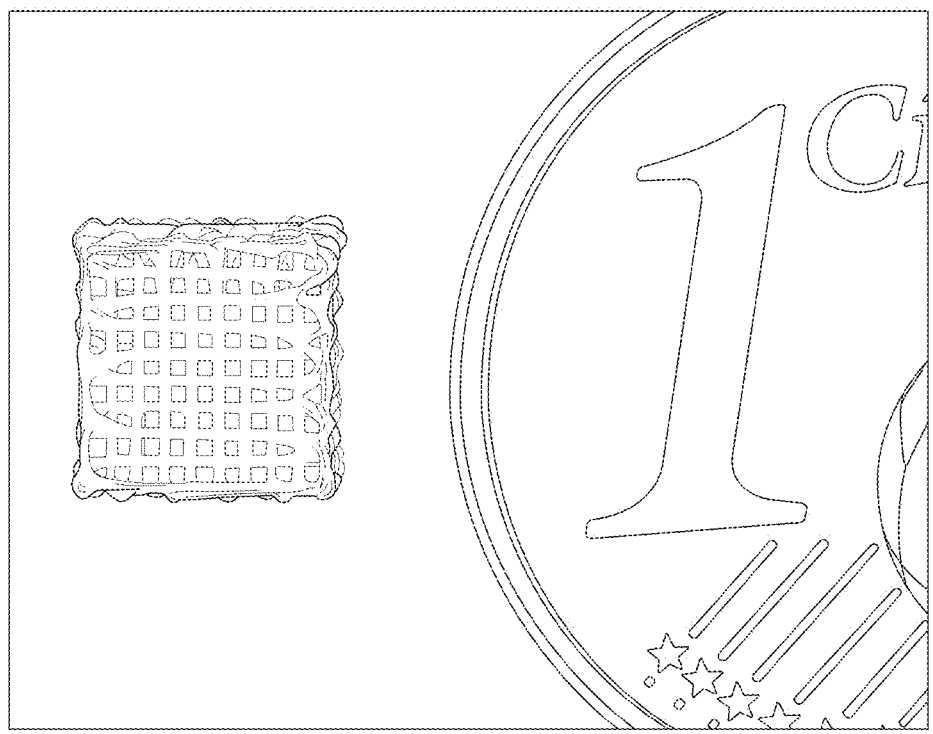
FIG. 5 is a photograph showing a 1-cent coin next to a cubic scaffold by 3D-printing using a fused filament deposition printer fed with a filament of the invention (made of PLGA loaded with 10% of C3S).

FIG. 5 shows a cubic scaffold obtained by 3D-printing using a fused filament deposition printer fed with a filament of the invention (made of PLGA loaded with 10% of C3S).

We can notice that the cubic scaffold is homogenously executed with regular holes of a diameter of about 200 μm.

In conclusion, this experiment evidences that:
the filament of the invention may be stored on a filament coil without any breakage issue and is 3D-printable; and
objects of small dimensions may be successfully 3D-printed from a filament coil of the invention.

The invention claimed is:

1. A filament comprising:
50% to 99% in weight to the total weight of the filament (w/w) of a polymeric matrix; and
1% to 50% w/w of tricalcium silicate.

2. The filament according to claim 1, further comprising dicalcium silicate, tricalcium aluminate, tricalcium oxide, gypsum and/or Portland cement.

3. The filament according to claim 1, wherein the polymeric matrix is made of at least one biocompatible polymer.

4. The filament according to claim 1, wherein the polymeric matrix is made of at least one biocompatible polymer selected from poly(lactic acid) or poly(lactide) (PLA), poly (glycolic acid) or poly(glycolide) (PGA), poly(lactide-co-glycolide) (PLGA), polycaprolactone (PCL), poly-(D,L)-lactide (PDLLA), polydioxanone (PDO), polyvinylalcohol (PVA), polyetherketoneketones (PEKK), polyetheretherketones (PEEK), polyetherimide (PEI) and any mixtures thereof.

5. The filament according to claim 1, wherein the amount of tricalcium silicate is ranging from 1% to 30% w/w.

6. The filament according to claim 1, wherein the amount of tricalcium silicate is ranging from 10% to 20% w/w.

7. The filament according to claim 1, wherein the amount of polymeric matrix is ranging from 70% to 99% w/w.

8. The filament according to claim 1, further comprising a radiopacifier.

9. The filament according to claim 8, wherein the radiopacifier is selected from zinc oxide, zirconium oxide, yttrium oxide, tin oxide, barium sulfate, tungsten oxide, bismuth oxide and barium oxide.

10. The filament according to claim 1, comprising
70% to 99% w/w of poly(lactide-co-glycolide) (PLGA) or polyetheretherketone (PEEK); and
1% to 30% w/w of tricalcium silicate.

11. The filament according to claim 1, having a diameter ranging from 1 mm to 10 mm.

12. A composition for manufacturing a filament according to claim 1, said composition comprising:
50% to 99% in weight to the total weight of the composition (w/w) of at least one biocompatible polymer; and
1% to 50% of tricalcium silicate;
wherein said composition is under the form of rods, pellets or granules.

13. The composition according to claim 12, wherein the biocompatible polymer selected from poly(lactic acid) or poly(lactide) (PLA), poly(glycolic acid) or poly(glycolide) (PGA), poly(lactide-co-glycolide) (PLGA), polycaprolactone (PCL), poly-(D,L)-lactide (PDLLA), polydioxanone (PDO), polyvinylalcohol (PVA), polyetheretherketones (PEEK), polyetherketoneketones (PEKK), polyetherimides (PEI) and any mixtures thereof.

14. A shaped body obtained by 3D printing using a fused filament deposition printer fed with a filament according to claim 1.

15. A bone substitute comprising a shaped body according to claim 14.

* * * * *